(12) United States Patent
DeSota et al.

(10) Patent No.: US 8,015,248 B2
(45) Date of Patent: *Sep. 6, 2011

(54) QUEUING OF CONFLICTED REMOTELY RECEIVED TRANSACTIONS

(75) Inventors: Donald R. DeSota, Portland, OR (US);
Robert Joersz, Portland, OR (US);
Davis A. Miller, Tigard, OR (US);
Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/413,581

(22) Filed: Mar. 29, 2009

(65) Prior Publication Data

US 2009/0187628 A1    Jul. 23, 2009

Related U.S. Application Data

(63) Continuation of application No. 10/739,699, filed on Dec. 18, 2003, now Pat. No. 7,529,800.

(51) Int. Cl.
*G06F 15/16* (2006.01)

(52) U.S. Cl. ........................................ 709/205; 711/151

(58) Field of Classification Search .......... 709/200–202, 709/205, 226; 711/111, 115, 144, 147, 150–152, 711/156, 163
See application file for complete search history.

(56) References Cited

U.S. PATENT DOCUMENTS

| 5,995,967 | A  | * | 11/1999 | Iacobovici et al. | 1/1 |
| 7,076,614 | B2 | * | 7/2006 | Sperber et al. | 711/143 |
| 7,529,800 | B2 | * | 5/2009 | DeSota et al. | 709/205 |
| 2003/0005234 | A1 | * | 1/2003 | Sperber et al. | 711/140 |

* cited by examiner

*Primary Examiner* — Moustafa M Meky
(74) *Attorney, Agent, or Firm* — Steve Bennett

(57) ABSTRACT

Queuing of received transactions that have a resource conflict is disclosed. A first node receives a first transaction from a second node, where the first transaction relates to a resource of the first node. The transaction may be a request relating to a memory line of the first node, for instance. It is determined that a second transaction that relates to this resource of the first node is already being processed by the first node. Therefore, the first transaction is enqueued in a conflict queue within the first node. The queuing may be a linked list, a priority queue, or another type of queue. Once the second transaction has been processed, the first transaction is restarted for processing by the first node. The first transaction is then processed by the first node.

8 Claims, 8 Drawing Sheets

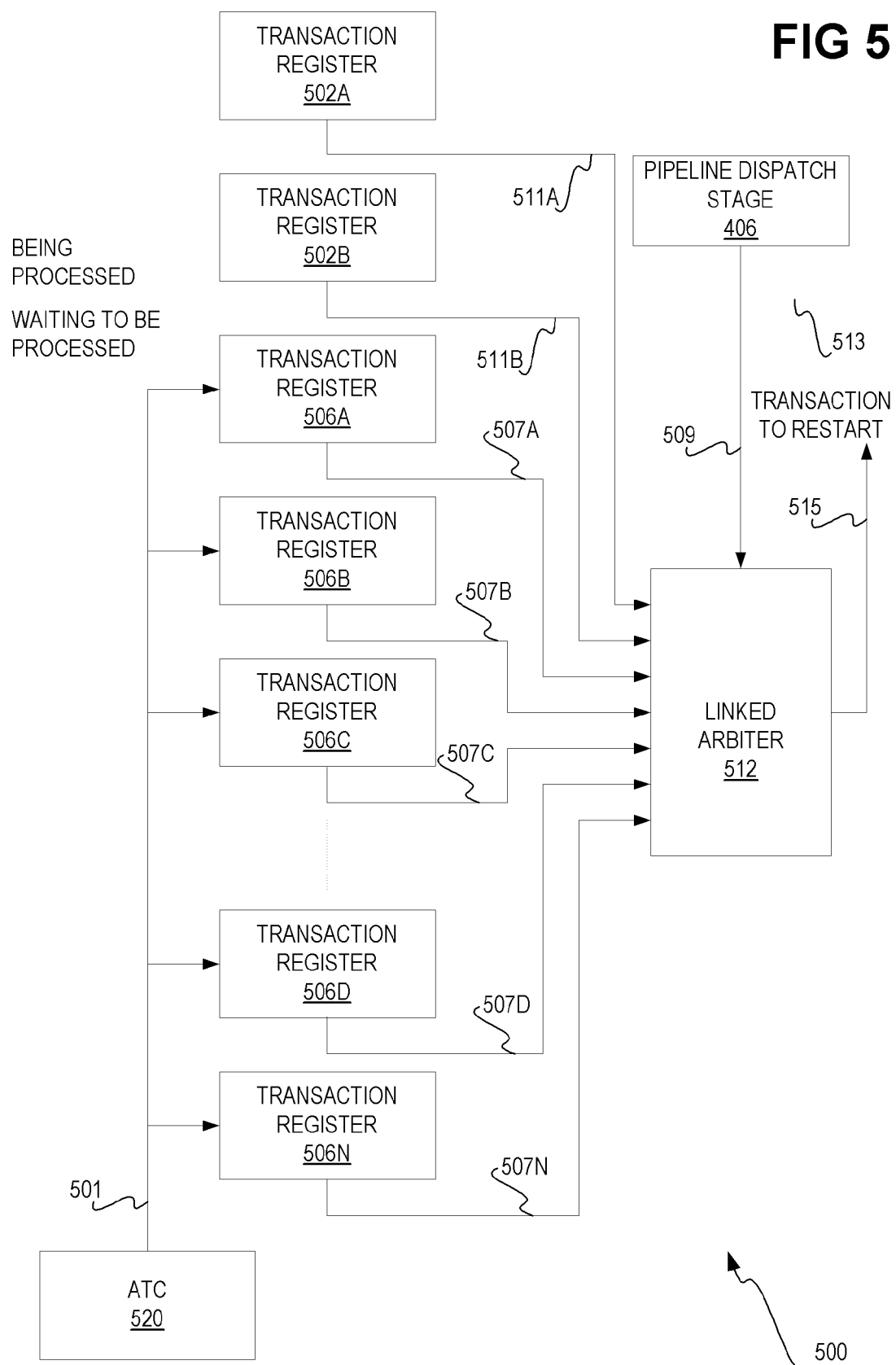

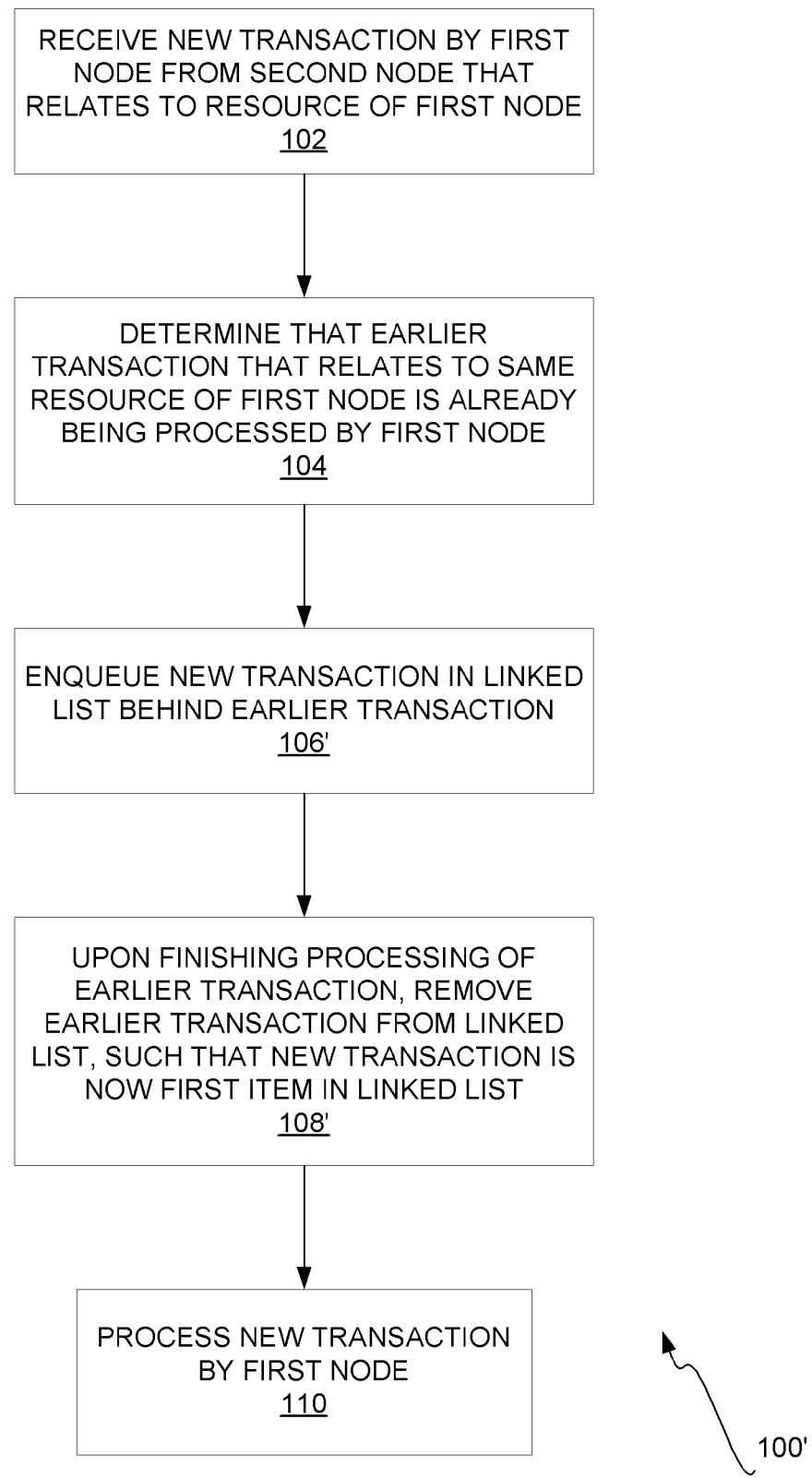

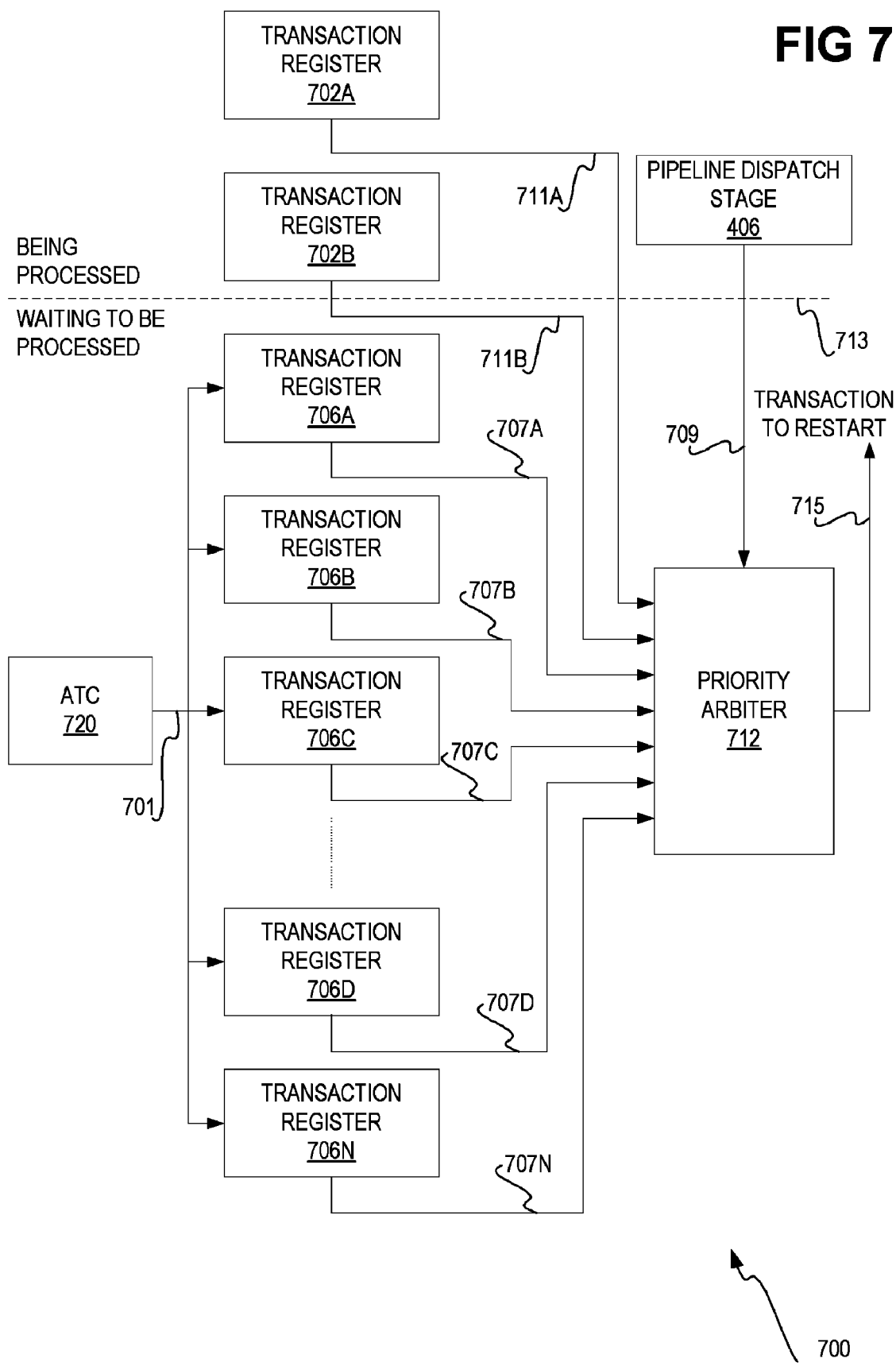

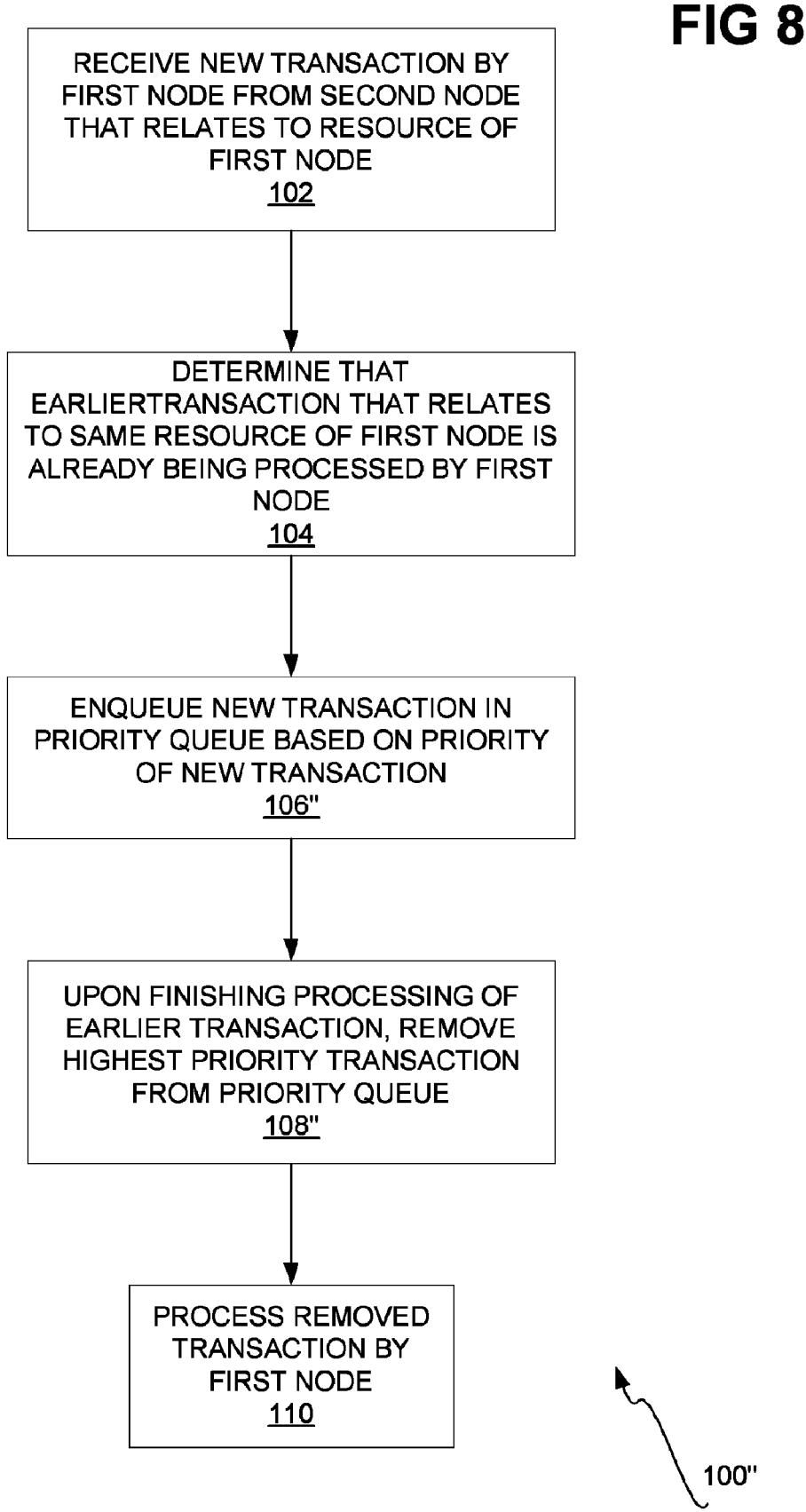

QUEUING OF CONFLICTED REMOTELY RECEIVED TRANSACTIONS

RELATED APPLICATIONS

The present patent application is a continuation of the previously filed and copending patent application filed on Dec. 18, 2003, and assigned Ser. No. 10/739,699.

BACKGROUND OF THE INVENTION

1. Technical Field

This invention relates generally to transactions, such as memory requests and their responses, and more particularly to the temporary storage of remotely received transactions that relate to resources to which other transactions already being processed also relate, and thus that conflict with these other transactions.

2. Description of the Prior Art

There are many different types of multi-processor computer systems. A Symmetric Multi-Processor (SMP) system includes a number of processors that share a common memory. SMP systems provide scalability for multithreaded applications and allow multiple threads to run simultaneously. As needs dictate, additional processors, memory or input/output (I/O) resources can be added. SMP systems usually range from two to 128 or more processors. One processor generally boots the system and loads the SMP operating system, which brings the other processors online. Without partitioning, there is only one instance of the operating system in memory. Since all processors access the same memory, sharing of data can be accomplished by simply placing the data in memory. The operating system uses the processors as a pool of processing resources, all executing simultaneously, where each processor either processes data or is in an idle loop waiting to perform a task. SMP system throughput increases whenever processes can be overlapped until all processors are fully utilized.

A Massively Parallel Processor (MPP) system can use thousands or more processors. MPP systems use a different programming paradigm than more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. The problem should be broken down with nodes explicitly communicating shared information via a message-passing interface over the interconnect. For example, in scientific environments, certain simulations and mathematical problems can be split apart and each part processed at the same time.

A Non-Uniform Memory Access (NUMA) system is a multi-processing system in which memory is separated into distinct banks. NUMA systems are a type of SMP systems. In Uniform Memory Access (UMA)-SMP systems, all processors access a common memory at the same speed. NUMA systems are usually broken up into nodes containing one to eight, or more, processors. The nodes typically also contain a portion of the global memory. The memory local to a node typically is closer in physical and logical proximity, and thus is accessed faster than memory in more distant parts of the system. That is, local memory is accessed faster than distant shared memory. NUMA systems generally scale better to higher numbers of processors than UMA-SMP systems, due to the distribution of memory causing less contention in the memory controller.

Multi-processor systems usually include one or more coherency controllers to manage memory transactions from the various processors and I/O. Transactions are requests or responses relative to memory or another type of resource. For instance, transactions may be requests to read or write data to memory or another type of resource, or may be responses issued after the requests have been processed. The coherency controllers negotiate multiple read and write requests emanating from the processors or I/O, and also negotiate the responses back to these processors or I/O. Usually, a coherency controller includes a pipeline, in which transactions, such as requests and responses, are input, and actions that can be performed relative to the memory for which the controller is responsible are output. Transaction conversion is commonly performed in a single stage of a pipeline, such that transaction conversion to performable actions is performed in one step.

Transactions may be remote, in that they originate from nodes other than the node that is to process the transactions. The transactions are thus received by the processing node that is to process the transactions, from originating nodes that originated the transactions. If such transactions relate to resources of the processing node, such as the memory of this node, that are related to other transactions that are already currently being processed, then the processing node sends retry responses to the originating nodes. A retry response indicates to an originating node that it is to retry the transaction at a later time. This approach for handling conflict transactions is disadvantageous, however. It can cause undue bandwidth consumption on the interconnect that connects the nodes and adds to the latency of the retried transaction.

Furthermore, the approach may be unfair to the originating nodes. An originating node may have a high priority transaction, for instance, that keeps getting bounced back with a retry request from the processing node. This may be because other transactions relating to the same resources fortuitously are being processed by the processing node each time the high priority transaction is sent by the originating node. For these and other reasons, therefore, there is a need for the present invention.

SUMMARY OF THE INVENTION

The invention relates scoreboarding in transaction registers of received transactions and any conflict information so the transaction can be restarted when the conflict is removed. When the coherency controller receives a new transaction, then information on that transaction is placed in a transaction register. A system of the invention includes a number of nodes that are interconnected to one another. Each node includes one or more processors, local memory for these processors, at least one controller to process transactions relating to the local memory of the node that are received from the other nodes, and a set of transaction registers. The transaction registers store information on transactions received by the coherency controller. The transaction register scoreboard holds information on those of the transactions relating to lines of the local memory to which other of the transactions currently being processed relate, until the other transactions have been processed.

A controller for a node of a system of the invention includes a pipeline in which transactions are processed and a set of transaction registers. The transaction registers store information on transactions that have been processed by the pipeline. In the case of an address conflict with a previous transaction the transaction register information includes a reference to the conflicting address and a flag that this transaction is stalled due to an address conflict. When the previous transaction completes the stalled transaction is selected to restart. Other features and advantages of the invention will become apparent from the following detailed description of the presently preferred embodiment of the invention, in conjunction with the accompanying drawings.

BRIEF DESCRIPTION OF THE DRAWINGS

FIG. 5 is a diagram of queued transactions that form a linked list, according to an embodiment of the invention.

FIG. 6 is a flowchart of the method of FIG. 1 adapted to queued transactions that form a linked list, according to an embodiment of the invention.

FIG. 7 is a diagram of transaction registers that form a prioritized queue, according to an embodiment of the invention.

FIG. 8 is a flowchart of the method of FIG. 1 adapted to transaction registers that form a prioritized queue, according to an embodiment of the invention.

DESCRIPTION OF THE PREFERRED EMBODIMENT

Overview

Figure 1:
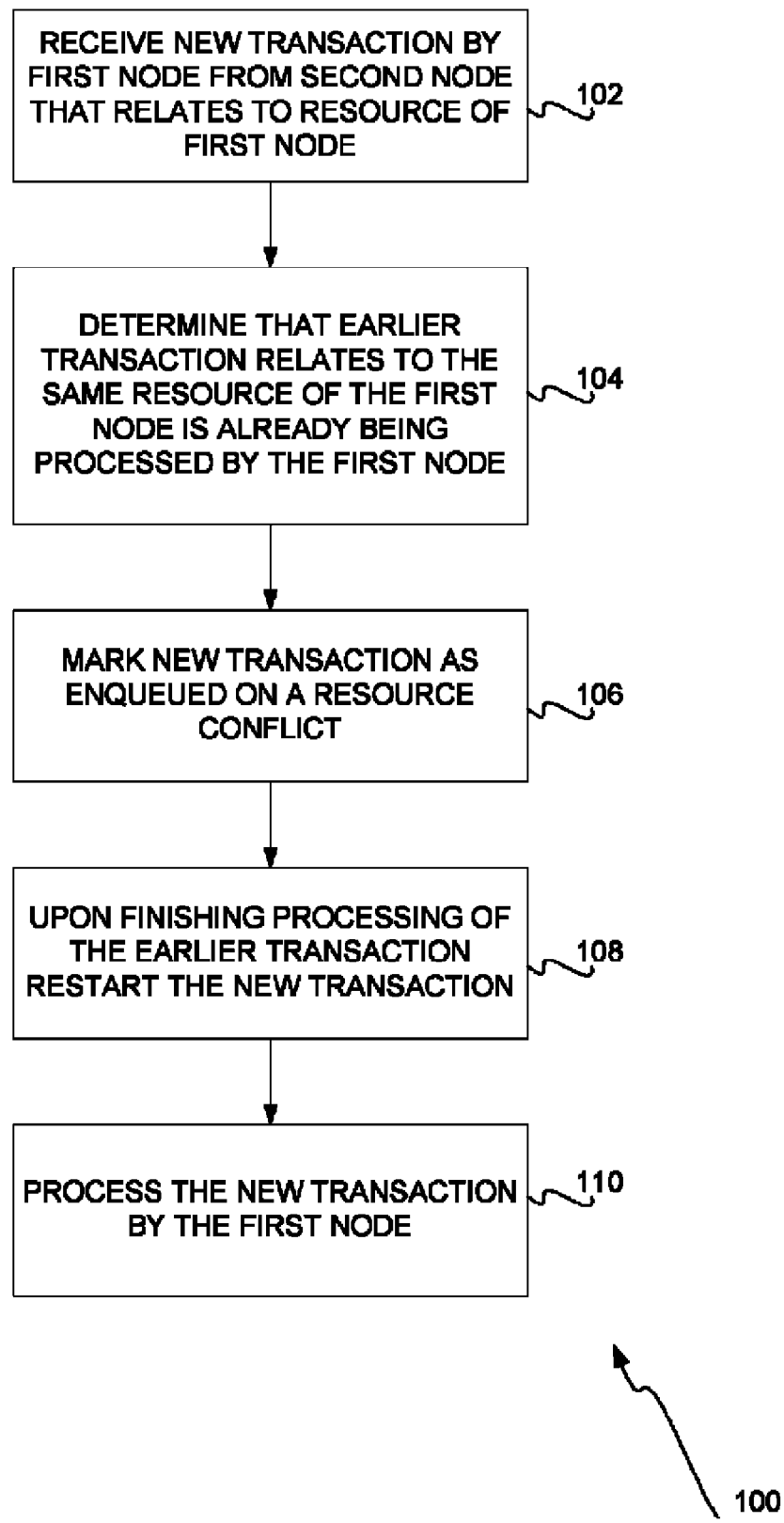
FIG. 1 is a flowchart of a method according to a preferred embodiment of the invention, and is suggested for printing on the first page of the patent.

FIG. 1 shows a method 100, according to the present invention. A new transaction that relates to a resource of a first node is received by the first node from a second node (102). The resource may be a memory line of the first node, or another type of resource. A memory line is more generally a memory address. The new transaction may thus be a request to read from or write to the memory line, it may be a response to an earlier request, or it may be another type of transaction. It is determined that an earlier transaction is already being processed by the first node that relates to the same resource of the first node (104). That is, for instance, the earlier transaction may relate to the same memory line as does the new transaction.

Therefore, the new transaction is marked as enqueued within the transaction register scoreboard of the first node (106). Such enqueuing is performed in lieu of sending a retry response from the first node to the second node. That is, the first node enqueues the new transaction in its transaction registers, rather than indicating to the second node that it is to retry sending the new transaction for processing at a later time. This reduces bandwidth utilization of the interconnect that connects the first and the second nodes, and also serves to speed processing of the new transaction. Once the processing of the earlier transaction has been finished by the first node, the new transaction is restarted in the pipeline (108), and is processed by the first node (110).

System

Figure 2:
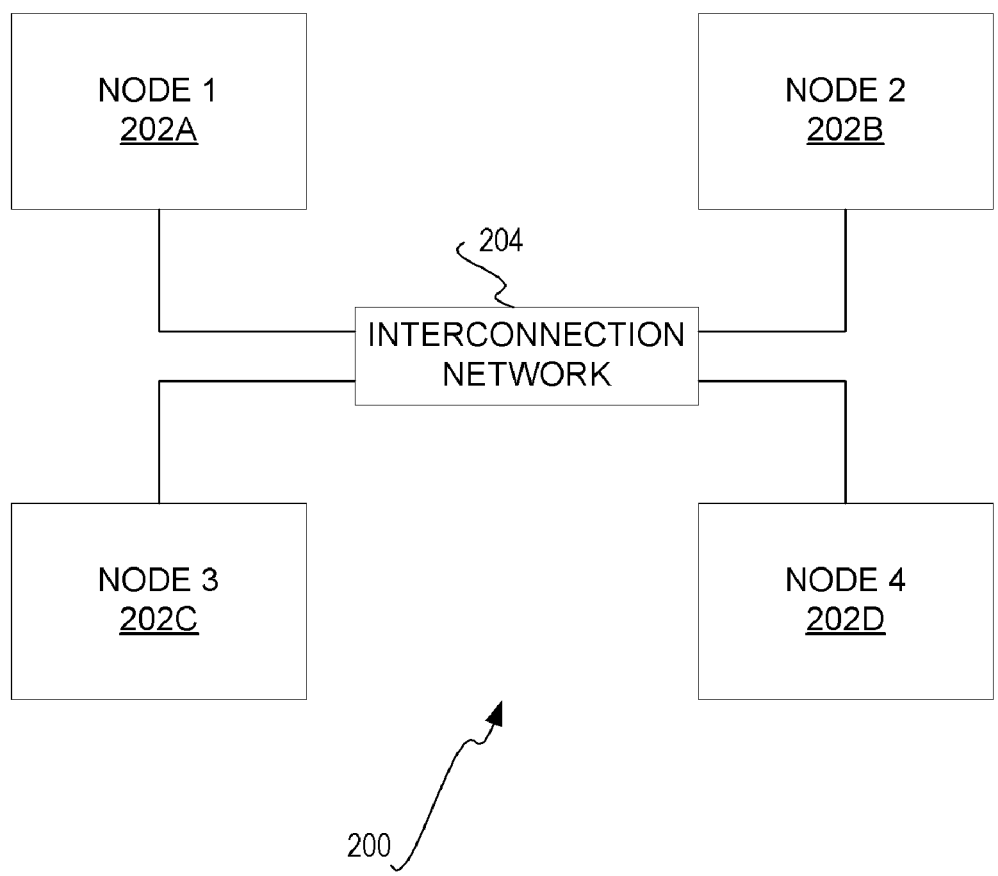
FIG. 2 is a diagram of a system having a number of multi-processor nodes, in conjunction with which embodiments of the invention may be implemented.

FIG. 2 shows a system 200 in accordance with which embodiments of the invention may be implemented. The system 200 includes a number of multiple-processor nodes 202A, 202B, 202C, and 202D, which are collectively referred to as the nodes 202. The nodes 202 are connected with one another through an interconnection network 204. Each of the nodes 202 may include a number of processors and memory. The memory of a given node is local to the processors of the node, and is remote to the processors of the other nodes. Thus, the system 200 can implement a non-uniform memory architecture (NUMA) in one embodiment of the invention.

Figure 3:
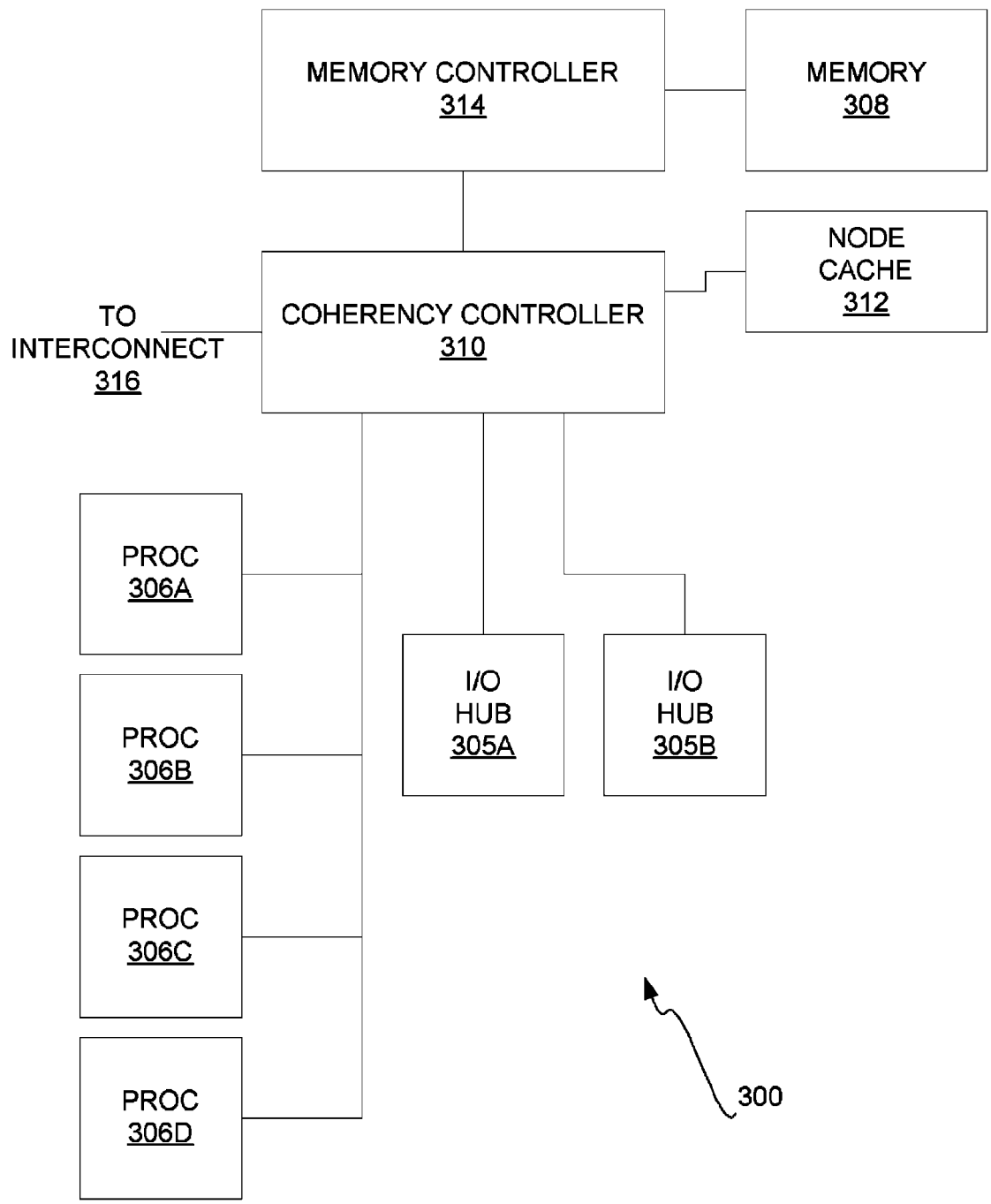
FIG. 3 is a diagram of one of the nodes of the system of FIG. 2 in more detail, according to an embodiment of the invention.

FIG. 3 shows in more detail a node 300, according to an embodiment of the invention, which can implement one or more of the nodes 202 of FIG. 2. As can be appreciated by those of ordinary skill within the art, only those components needed to implement one embodiment of the invention are shown in FIG. 3, and the node 300 may include other components as well. The node 300 has four processors 306A 306B, 306C, and 306D, collectively referred to as the processors 306. The node 300 also has two input-output (I/O) hubs 305A and 305B, used to attach peripheral controllers, and which are collectively referred to as the I/O hubs 305. The I/O hubs 305 may also generate requests for memory that must be processed by the coherency controller.

The node 300 has a portion of system memory, referred to as the memory 308. The memory 308 represents an amount of memory local to the node. Memory 308 may include Random Access Memory (RAM). The node 300 may have more than a single bank of memory, however. The memory controller 314 manages requests to and responses from the memory 308. The coherency controller 310 maintains coherency for the memory (308). The coherency controller 310 may be an application-specific integrated circuit (ASIC) in one embodiment, as well as another combination of software and hardware. The coherency controller 310 also may have a remote cache 312 for managing requests and responses that relate to remote memory, which is the local memory of nodes other than the node 300 is a part. Stated another way, the memory 308 is local to the node 300, and is remote to nodes other than the node 300. The coherency controller 310 is preferably directly connected to the interconnection network that connects all the nodes, such as the interconnection network 204 of FIG. 2, as indicated by the reference number 316.

Figure 4:
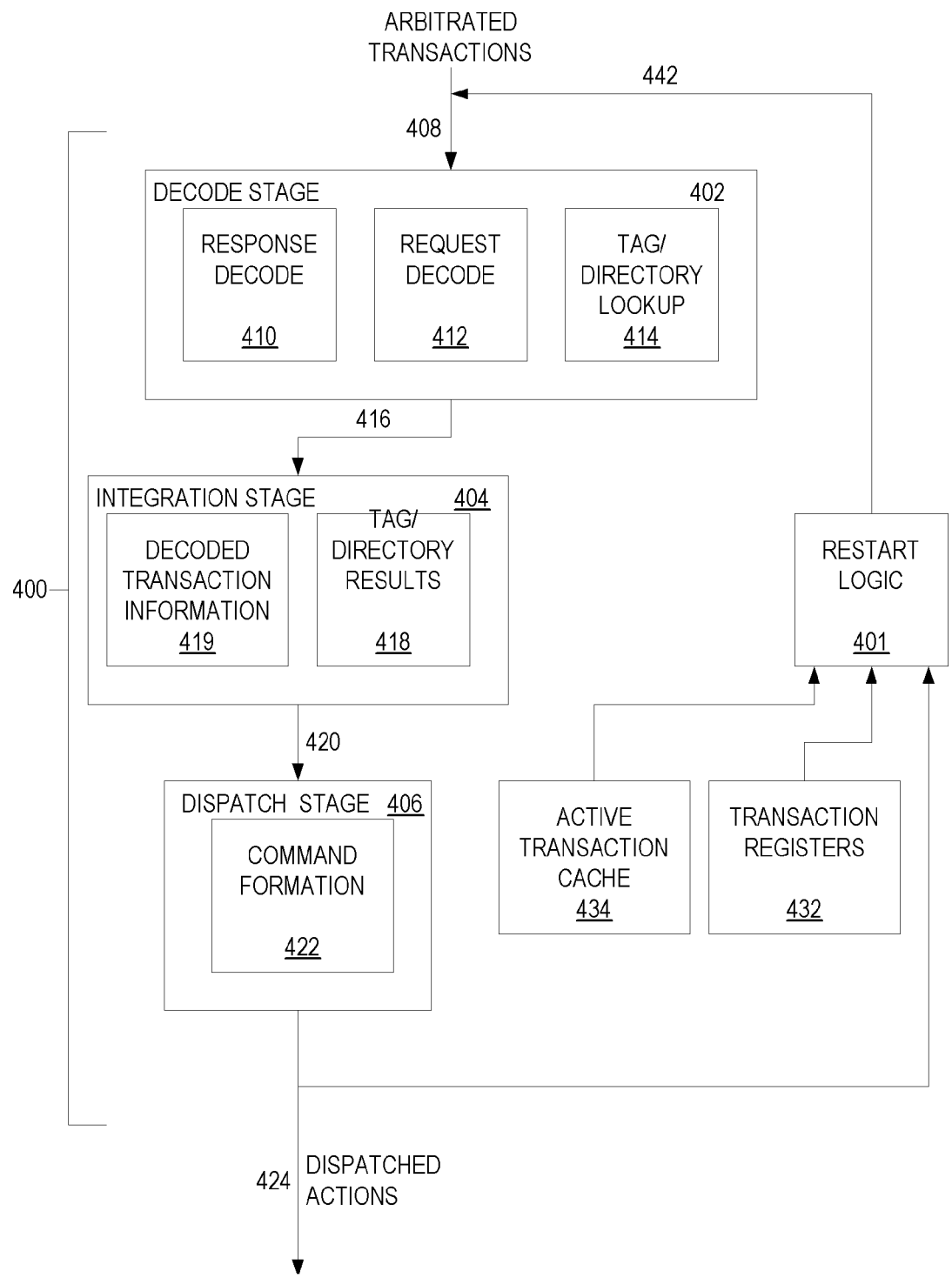
FIG. 4 is a diagram of a multiple-stage pipeline to negotiate memory transactions and transaction registers to store information on transactions, according to an embodiment of the invention.

FIG. 4 shows a multiple-stage pipeline 400 that may be implemented in the coherency controller 310 FIG. 3, as well as transaction registers 432 for storage of transaction information including enqueuing information, restart logic 401 for controlling restarting of enqueued transactions, and an Active Transaction Cache (ATC) 434 to hold temporary state information on transactions currently being processed, according to an embodiment of the invention. The multiple-stage pipeline 400 includes a decode stage 402, an integration stage 404, and a dispatch stage 406. As can be appreciated by those of ordinary skill within the art, the pipeline 400 may also have additional stages other than stages 402, 404, and 406 depicted in FIG. 4.

Because the pipeline 400 is a multiple-stage pipeline, more than one transaction can be processed in the pipeline 400 at one time, each transaction in the pipeline 400 being in a different stage of the pipeline 400. Transactions that have been arbitrated in a given order enter the decode stage 402, as indicated by the incoming arrow 408. The decode stage specifically includes a response decode part 410, a request decode part 412, and a tag/directory lookup part 414. The parts 410 and 412 decode responses and requests, respectively, into internal commands, using the tag/directory lookup part 414 to determine the correct coherency operation(s) to perform.

The internal commands are then input into the integration stage 404, as indicated by the incoming arrow 416. The integration stage 404 specifically processes decoded transaction information 419 of the internal commands received from the decode stage 402, and tag/directory results 418 of the internal commands received from the decode stage 402. Thus, based on the transaction information 419 and the tag/directory results 418, the integration stage 404 combines the decoded transaction information with the tag/directory lookup information to form an index for command formation.

The results of the integration stage 404 are then input into the dispatch stage 406, as indicated by the incoming arrow 420. The dispatch stage 406 utilizes the results of the integration stage 404 to form the commands that when performed effect the transactions, as a command formation part 422. The resulting actions can then be dispatched, as indicated by the outgoing arrow 424, for concurrent performance thereof to effect the transaction that had initially been input into the decode stage 402. Processing an entire coherency transaction may take multiple passes down the pipeline, for example request processing and response processing.

If a transaction that is received by the node of which the pipeline 400 is a part relates to the same resource, such as the same line of memory, to which another transaction relates that is currently being processed within the pipeline 400, then the node stores the conflict information in one of the transaction registers 432. The conflicting address will be in the ATC 434. The index to the ATC 434 entry and a flag marking the entry as queued on a conflict are stored in one of the transaction registers 432. When the transaction that relates to the same resource completes, the transaction register in question (viz., the one of the transaction registers 432 in which the conflict information is stored) signals to the restart logic 401 that the transaction is completed, and the restart logic uses the ATC index for the retiring transaction and the queuing information in the transaction register 432 to restart the first transaction. This transaction can then be processed within the pipeline 400, without ever having to contact the originating node of the transaction that a conflict had at one time occurred.

Enqueuing as a Linked List

FIG. 5 shows a linked list 500 that can be implemented for restarting transactions, according to an embodiment of the invention. Transactions currently in the pipeline are in the transaction registers 502A and 502B, above the line 513, whereas transactions waiting for further processing are in the transaction registers 506A, 506B, 506C, 506D, ..., 506N, below the line 513. The former registers are collectively referred to as the registers 502, whereas the latter registers are collectively referred to as the registers 506. When a transaction begins processing and enters the pipeline it is allocated one of the transaction registers 502 to hold information about the transaction. When the transaction completes its pass down the pipeline, the transaction is completed, enqueued for further processing, or enqueued on a conflict.

To enqueue conflicted transactions as a linked list, when a transaction is first processed a check is done to see if there is an address conflict. This is done by checking to see if the active transaction cache (ATC) 520 references any current transactions having a resource address that matches the resource address of the new transaction stored in the register 502A or 502B. The resource may be a section of a memory such as a memory line. Hereinafter, a memory line is used as an example of the resource to describe the present invention. The ATC 520 also holds a reference to the tail of the list for this address. That is, the ATC 520 stores a reference to the last item in the linked list. Any number of transactions can be linked on a single address.

When a new transaction is detected as having an address conflict with the current transaction, a reference to the tail of the linked list is also loaded into a previous transaction field of the transaction register storing the new transaction, as indicated by the arrow 501. The transaction register storing the new transaction may be one of the registers 502. A reference to the tail of the list in the ATC is updated to refer to the new transaction. When the current transaction is completed the pipeline dispatch stage 406 signals to the linked arbiter 512 that the current transaction is retired, as indicated by the arrow 509. A reference to the retiring transaction is also provided to the linked arbiter 512, as indicated by the arrow 511A or 511B, depending on which of the registers 502A or 502B that holds the retiring transaction. The reference to the retiring transaction is provided to the linked arbiter 512 in one embodiment in the same stage as, or the stage after, the transaction in the register 502A or 502B has finished processing. The finishing of the processing of the transaction is the event that causes the reference to the retiring transaction to be provided to the arbiter 512. The linked arbiter 512 compares the reference to the retiring transaction with previous transaction fields stored with transactions in the registers 506, as indicated by the arrows 507A, 507B, 507C, 507D, ..., 507N, collectively referred to as the arrows 507. The transaction stored in one of the registers 506 having a previous transaction field referencing the retiring transaction is selected to restart, as indicated by the arrow 515.

FIG. 6 shows the method 100 of FIG. 1 implemented as the linked list 500 of FIG. 5, and indicated as the method 100', according to an embodiment of the invention. A new transaction is received by a first node from a second node, and relates to a resource of the first node (102). It is determined that an earlier transaction relates to the same resource of the first node and is already being processed by the first node (104). Therefore, the new transaction is enqueued in the linked list behind the earlier transaction (106'). That is, the earlier transaction links to the new transaction. Once the earlier transaction has finished being processed, it is removed from the linked list (108'). Thus, the new transaction is now the first item in the linked list, replacing the earlier transaction, and as such is processed by the first node (110).

Enqueuing as a Prioritized List

FIG. 7 shows a prioritized list 700 that can be implemented for restarting transactions, according to an embodiment of the invention. Similar to the linked list 500 of FIG. 5, transactions currently in the pipeline are stored in the transaction registers 702A and 702B, above the line 713, whereas transactions waiting to be processed are stored in the transaction registers 706A, 706B, 706C, 706D, ..., 706N, below the line 713. The former registers are collectively referred to as the registers 702, whereas the latter registers are collective referred to as the registers 706. When a transaction begins processing and enters the pipeline it is allocated one of the registers 702 to hold information about the transaction. To enqueue transactions as a prioritized list, when a transaction is first processed a check is done to see if there is an address conflict. This is done by checking to see if the active transaction cache (ATC) 720 has references to any current transactions having a memory line address that matches the memory line address of the new transaction stored in the register 702A or 702B. If an address conflict exists the new transaction is queued within one of the transaction registers 706, pending retirement of the conflicting transaction.

When a new transaction is determined to have an address conflict with a current transaction, a reference to the current transaction as well as the priority of the new transaction are also loaded into the transaction register 706 holding the new transaction, as indicated by the arrow 701. When the current transaction completes processing, the priority arbiter 712 is signaled by the pipeline dispatch stage 406 that the current transaction is retired, as indicated by the arrow 709. A reference to the retiring transaction is also provided to the priority arbiter 712, as indicated by the arrow 711A or 711B, depending on which of the registers 702A or 702B holds the retiring transaction. The reference to the retiring transaction is provided to the priority arbiter 712 in one embodiment in the same stage as, or the stage after, the transaction in the register 702A or 702B has finished processing. The finishing of the processing of the transaction is the event that causes the reference to the retiring transaction to be provided to the arbiter 712. The priority arbiter 712 compares the priorities and the transaction pointers of the transactions stored in the registers 706, as indicated by the arrows 707A, 707B, 707D, . . . , 707N, collectively referred to as the arrows 707. The highest priority transaction stored in one of the registers 706 that has a reference to the retiring transaction is selected to restart, as indicated by the arrow 715. If there is more than one transaction stored in the registers 706 that have the same priority and that point to the identity of the retiring transaction, then a fair arbitration scheme is used to select among them.

FIG. 8 shows the method 100 of FIG. 1 implemented as the prioritized list 700, and indicated as the method 100", according to an embodiment of the invention. A new transaction is again received by a first node from a second node, and relates to a resource of the first node (102). It is determined that an earlier transaction exists that relates to the same resource of the first node, and that is already being processed by the first node (104). Therefore, the new transaction is enqueued in the prioritized queue, based on its priority relative, or compared, to the priorities of any other transactions already in the prioritized queue (106"). Once the earlier transaction has finished being processed, the highest priority new transaction in the prioritized queue is removed therefrom (108"). This removed transaction is then processed by the first node (110).

Advantages Over the Prior Art

Embodiments of the invention allow for advantages over the prior art. The utilization of queuing enables the node that receives a new transaction that relates to a resource thereof that is already being used by an earlier transaction to process the new transaction when the conflict is removed, rather than returning a retry request to the node that sent the new transaction. This reduces bandwidth utilization on the interconnect that connects the nodes, providing for potentially better system performance.

Furthermore, the utilization of queuing generally enables transaction processing to be performed in a fairer manner. For example, in the prior art an originating node may send a first transaction to a processing node for processing. If the processing node is already processing a second transaction that relates to the same resource, then it returns a retry request to the originating node to retry the request later. The second transaction already being processed by the processing node may then be finished, but a third transaction may be received by the processing node that relates to the same resource.

Thus, when the originating node retries its first transaction, the processing node again sends back a retry request, because of the third transaction being processed, even though the originating node had initially sent its first transaction to the processing node before the third transaction was received by the processing node. In the invention, the utilization of linked list queuing avoids this fairness issue, because the first transaction will be queued for processing after the second transaction has been completed. The third transaction may then be queued for processing after the second transaction has been completed, and thus may be processed after the first transaction has been processed. In addition, the use of prioritized queuing allows incoming transaction to be given a priority for processing whereas in a retry mechanism the order of restart may be random.

Alternative Embodiments

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a non-uniform memory access (NUMA) architecture. However, the invention is amenable to implementation in conjunction with systems having other architectures as well. As another example, the system that has been described has one coherency controller per node. However, more controllers may also be used to implement a system in accordance with the invention. Accordingly, the scope of protection of this invention is limited only by the following claims and their equivalents. The queuing may be implemented for locally generated transaction with resource conflicts as well as with remote transactions.

I claim:

1. A system comprising:
a plurality of nodes interconnected to one another, each node comprising:
a processor;
local memory for the processor;
at least one controller to process transactions relating to the local memory of the node received from other of the plurality of nodes, where each transaction is a read or write request relating to the local memory; and,
at least one queue to temporarily store those of the transactions relating to lines of the local memory to which other of the transactions currently being processed relate until the other of the transactions have been processed, such that those of the transactions relating to lines of the local memory are enqueued within the at least one queue in response to determining that the other of the transactions also relating to the lines of the local memory are already being processed.

2. The system of claim 1, wherein each node further comprises an arbiter to determine which of those of the transactions temporarily stored in the at least one queue to restart upon the other of the transactions having been processed.

3. The system of claim 1, wherein each controller comprises a multiple-stage pipeline in which the transactions are processed, such that those of the transactions queued are restarted and placed in the pipeline for processing once the other of the transactions have exited the pipeline.

4. The system of claim 1, wherein each queue comprises a linked list, such that those of the transactions queued are linked in the linked list in an order in which they are received and are removed from the linked list and processed.

5. The system of claim 1, wherein each queue comprises a prioritized queue, such that those of the transactions queued are ordered within the prioritized queue based on their priorities, such that transactions are removed from the prioritized queue and processed based on their priorities.

6. The system of claim 1, wherein the local memory of each node is local random-access memory (RAM).

7. The system of claim 1, wherein each controller of each node comprises an application-specific integrated circuit (ASIC).

8. A system comprising:
 a plurality of nodes interconnected to one another, each node comprising:
  a processor;
  local memory for the processor;
  at least one controller to process transactions relating to the local memory of the node received from other of the plurality of nodes, where each transaction is a read or write request relating to the local memory;
  at least one queue to temporarily store those of the transactions relating to lines of the local memory to which other of the transactions currently being processed relate until the other of the transactions have been processed, such that those of the transactions relating to lines of the local memory are enqueued within the at least one queue in response to determining that the other of the transactions also relating to the lines of the local memory are already being processed; and,
  an arbiter to determine which of those of the transactions temporarily stored in the at least one queue to restart upon the other of the transactions having been processed.

* * * * *